(12) United States Patent
Czajka et al.

(10) Patent No.: US 8,061,842 B2
(45) Date of Patent: Nov. 22, 2011

(54) METHOD OF EYE ALIVENESS TESTING AND DEVICE FOR EYE ALIVENESS TESTING

(75) Inventors: Adam Czajka, Warsaw (PL); Andrzej Pacut, Izabelin (PL); Marcin Chochowski, Warsaw (PL)

(73) Assignee: Naukowa I Akademicka Siec Komputerowa Nask (PL)

( * ) Notice: Subject to any disclaimer, the term of this patent is extended or adjusted under 35 U.S.C. 154(b) by 319 days.

(21) Appl. No.: 12/440,346

(22) PCT Filed: Aug. 30, 2007

(86) PCT No.: PCT/PL2007/000063
§ 371 (c)(1),
(2), (4) Date: Mar. 6, 2009

(87) PCT Pub. No.: WO2008/030127
PCT Pub. Date: Mar. 13, 2008

(65) Prior Publication Data
US 2010/0171925 A1    Jul. 8, 2010

(30) Foreign Application Priority Data

Sep. 7, 2006   (PL) .......................................... 380581

(51) Int. Cl.
*A61B 3/00* (2006.01)
(52) U.S. Cl. .................................................... 351/246
(58) Field of Classification Search .................. 351/205, 351/206, 221, 208, 246; 382/2, 6; 354/62; 362/227, 231
See application file for complete search history.

(56) References Cited

U.S. PATENT DOCUMENTS
4,641,349 A * 2/1987 Flom et al. .................... 382/117

OTHER PUBLICATIONS

John Dougman, "Recognizing Persons by Their Iris Patterns," Jain, Bolle, Pankanti, *Biometrics: Personal Identification in Networked Society*, Amsterdam: Kluwer (1999), pp. 103-121.

* cited by examiner

*Primary Examiner* — Hung Dang
(74) *Attorney, Agent, or Firm* — McCracken & Frank LLC

(57) ABSTRACT

In compliance with the method, the measurement of the characteristic dimensions of the hypothetical pupil are taken on the basis of a sequence of images. The eye is stimulated with the light featuring a pre-defined intensity profile. For each image in this sequence, the characteristic dimensions of the hypothetical pupil are calculated by means of image processing methods. For a sequence of images, the system determines the function $f$ which defines the changes in the characteristic dimensions of the hypothetical pupil within the measurement period, and on the basis of the said changes as well as on the selected mathematical model, the aliveness parameters O of the eye are determined by means of estimation methods. The calculated aliveness parameters are compared with the statistical template by way of classification process.

8 Claims, 2 Drawing Sheets

METHOD OF EYE ALIVENESS TESTING AND DEVICE FOR EYE ALIVENESS TESTING

BACKGROUND

The present invention relates to a method for automatic eye aliveness testing and device for automatic eye aliveness testing, which in particular is applied in the evaluation of whether the examined eye is an alive human eye, and is used in biometric identity verification systems.

Method of eye aliveness testing is known from the publication developed by John Daugman: "Countermeasures against Subterfuge", Section 8 in Daugman J., "Recognizing Persons by their Iris Patterns", Chapter 5 in "Biometrics: Personal Identification in Networked Society" (Jain, Bolle, Pankanti, editors), pp. 103-121, Amsterdam: Kluwer, 1999. In compliance with the method described in the said publication, certain dimensions of the iris and the pupil are tracked whereas the eye is stimulated by light of a varying intensity. Pupillary constriction and dilatation are determined within pre-defined measurement periods.

Known devices for eye aliveness testing contain light illuminator with the controlled intensity and a camera that produces a sequence of images and which is equipped with exposure automatic adjustment. The camera image is analyzed by the image measurement system.

Known solution does not allow for aliveness testing in an automatic and accurate way.

SUMMARY

According to one embodiment, a method of the invention consists in the fact that, for each image within the sequence, the system calculates the characteristic dimension of the hypothetical pupil by means of image processing methods. For the sequence of photographs, the system determines the function $f$, which defines the changes of the characteristic dimensions of the hypothetical pupil for the measurement period, and on the basis of the said modification as well as of the selected eye aliveness mathematical model, the system will determine the eye aliveness parameters $\theta$ by means of estimation methods. The calculated eye aliveness parameters are compared with the statistical template by way of classification process.

According to another embodiment, a device in the invention, consists in the fact that the measurement and control system input is equipped with a converter of analog signal into a digital image whose output is connected with the characteristic dimensions determination module whereas the second output is connected via a localization module with the characteristic dimensions determination module. The second output of the localization module is connected via a testing controller with an illumination profile controller, which constitutes the output of the measurement and control system. The second output of the testing controller is connected with the second input of the converter of analog signal into a digital image whilst the output of the characteristic dimensions determination module is connected with the eye aliveness parameters determination module whose second input is connected with the second output of the illumination profile controller and the third input of the eye aliveness parameters determination module is connected with the eye aliveness mathematical model. The output of the eye aliveness parameters determination module is connected with the classifier whose second input is connected with a statistical template whereas the third input of the classifier is connected with the classification methodology module.

The solution according to the invention allows to test the eye aliveness in an automatic and accurate way.

BRIEF DESCRIPTION OF THE DRAWINGS

Set forth is a more detailed description of the present invention with reference to the attached drawings, where.

DETAILED DESCRIPTION

Figure 1:
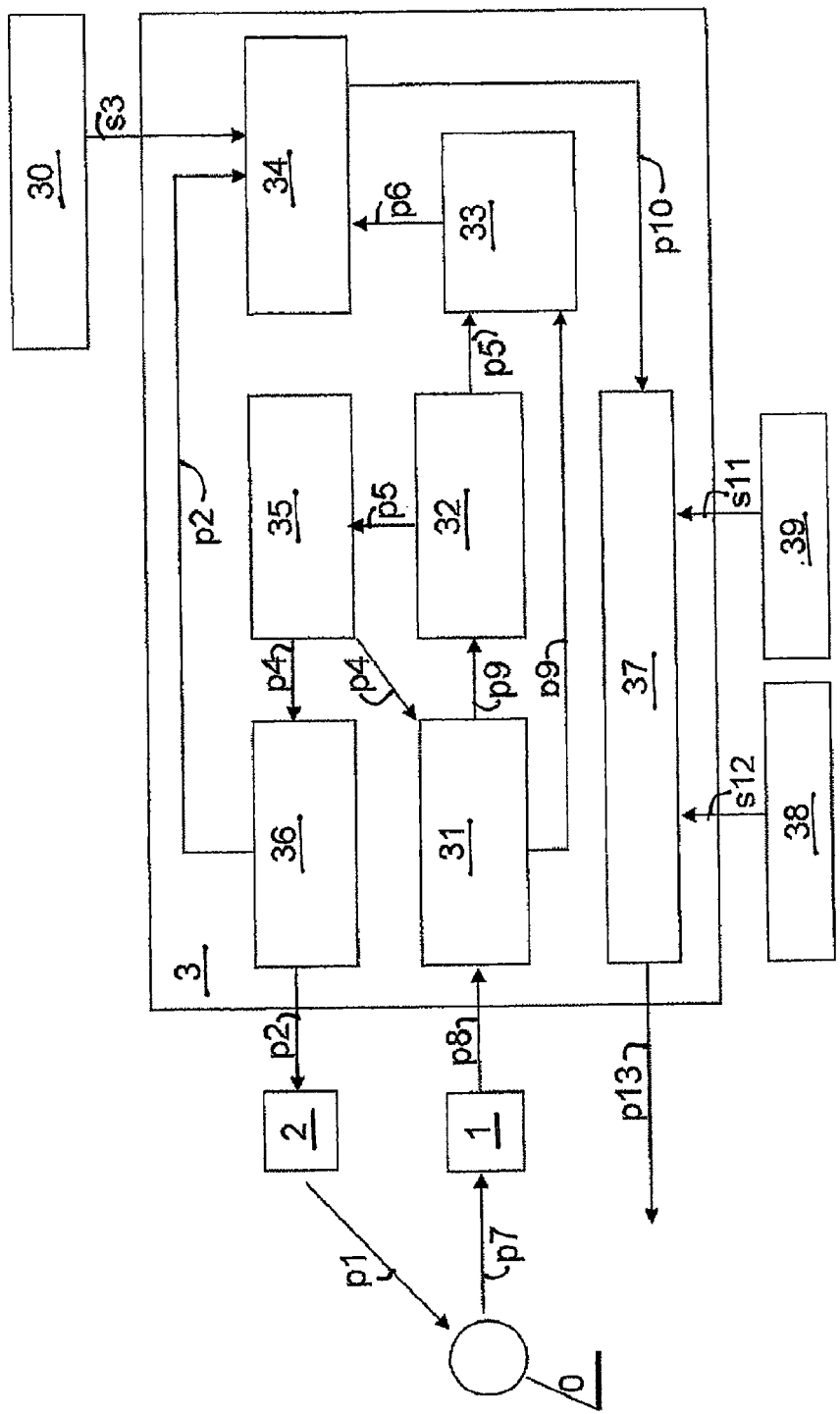
FIG. 1 represents the functional diagram of the device for automatic eye aliveness testing.

In compliance with the method, the system measures the characteristic dimension of the examined hypothetical pupil 0. To do so, the system generates a sequence of, images by means of camera 1 equipped with automatic exposure adjustment. The eye is stimulated by a visible light featuring a pre-defined intensity profile, by means of illuminator 2 equipped with automatic systems for modification of light color and intensity and which is controlled by the illumination profile controller 36. For each image in the sequence, the characteristic dimension of the hypothetical pupil is calculated by means of an image processing methodology in module 33, whereas for the sequence of images, the function $f$ is determined that defines a change in the characteristic dimension of the hypothetical pupil for the measurement period. On this basis and subject to a selected mathematical model, the parameters $\theta$ of eye aliveness are determined in module 34 by means of estimation methods. The calculated eye aliveness parameters are compared in classifier 37 with the statistical template 38 by way of classification process.

As shown in FIG. 1, the device for automatic eye aliveness testing contains the camera 1 with an automatic exposure adjustment, and the illuminator 2 which is equipped with the systems for automatic modification of light color and light intensity. The light p1 which features a controlled intensity profile from the illuminator 2 falls onto the examined hypothetical pupil 0 whereas the reflected light p7 is recorded by the camera 1 from where the image of the hypothetical pupil in the form of analog signal p8 is transferred to the measurement and control system 3. The input of this system is equipped with the converter of analog signal into digital image 31 containing the image acquisition board. The digital image of the hypothetical pupil p9 is sent to the input of the hypothetical pupil localization module 32 and to the input of the characteristic dimensions determination module 33. The signal representing the position of hypothetical pupil p5 is sent to the second input of this module 33 as well as to the input of the testing controller 35. The test initiation signal p4 sent by the testing procedure controller 35 to the second input of the converter of analog signal into digital image 31 and to the input of the profile controller 36. Once the system has determined the characteristic dimensions, the signal p6 will be sent by the characteristic dimensions determination module 33 to the aliveness parameters determination module 34. The light illumination profile signal p1 is sent by the light intensity profile controller 36, and the mathematical model parameters s3 are sent to the second input of the aliveness parameters determination module 34. The aliveness parameters p10 are sent to the first input of the classifier 37 while the signal s11 from the classification methodology module 39 goes to the second input of the classifier 37, and the parameters s12 of the statistical template 38 enter the third input of the classifier 37. The signal informing on the test results s13 is presented at the output of the classifier 37.

Figure 3:
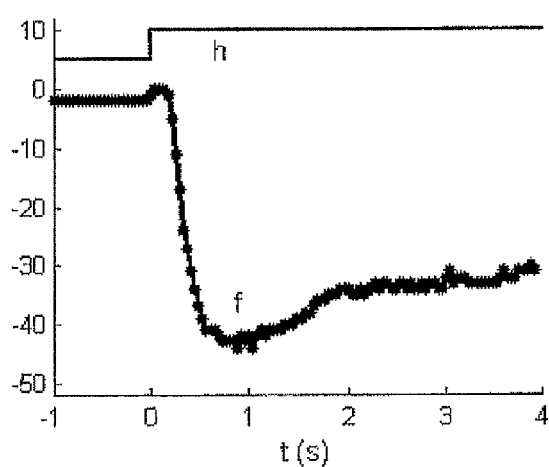

The device described above is designed for automatic determination of whether the examined eye is an alive human eye. To do so, the system produces a sequence of images of the examined hypothetical pupil 0 by means of camera 1, at a pre-defined light intensity profile originating from the illuminator 2. The characteristic dimensions of the hypothetical pupil are calculated for each image in the sequence. The characteristic dimensions are understood as the average diameter, defined as the average value of horizontal and vertical axes of the ellipse that approximates the pupil. A stepwise change of light intensity produces a visible change in the pupil diameter, shown in FIG. 3.

Having acquired the digital image p9 of the hypothetical pupil at the output of converter 31, the system localizes the hypothetical pupil within the image area. The test begins automatically when the hypothetical pupil is localized at a pre-defined place of the image within a pre-defined time, by the hypothetical pupil localization module 32.

Figure 2:
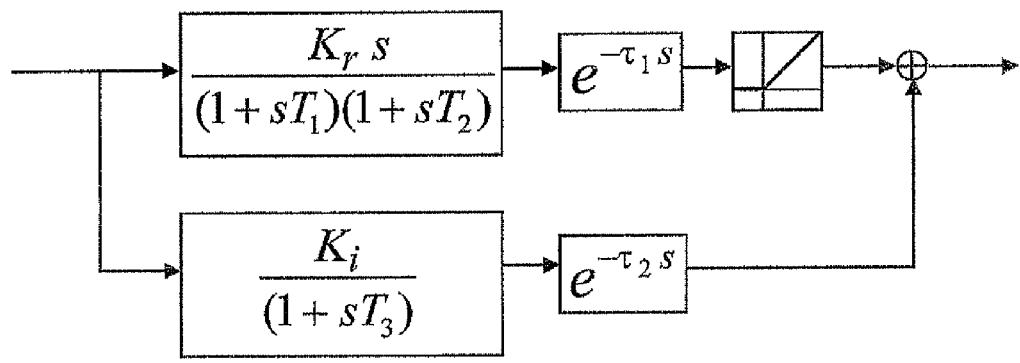
FIG. 2 represents the schema of the mathematical model of the eye pupil response to stepwise changes of the light intensity, where as FIG. 3 represents the graphical change in the characteristic dimension following a stepwise positive change in the intensity of the light that stimulates a human alive eye.

Each image, for which the system has determined the position of the hypothetical pupil as a result of localization, is characterized by means of one number which represents the average pupil diameter and is calculated in module 33. The images in the sequence are characterized by the function $f$ which defines the change of the average diameter of the hypothetical pupil within the measurement period. This function is designed for automatic identification of the model of pupil dynamics. FIG. 2 depicts the model that has been selected as the mathematical model of the pupil response to stepwise change in the intensity of the light stimulating the eye. This model has a form of two parallel channels: a differentiating channel and an inertial channel, which are described by linear and quadratic differential equations with delays, respectively, represented in the form of operator transfer functions. The differentiating channel is active only in the case of positive increments in light intensity. The identification of the model of pupil dynamics consists of determination of the parameters θ of the eye aliveness model, where $\theta = [K_i\ K_r\ T_1\ T_2\ T_3\ \tau_i\ \tau_2]$, where:

θ: the vector of parameters of the eye aliveness model
$K_r$: the differentiating channel gain,
$K_i$: the inertial channel gain,
$T_1$, $T_2$: the differentiating channel time constants,
$T_3$: the inertial channel time constant,
$\tau_i$: the differentiating channel delay, and
$\tau_2$: the inertial channel delay.

Module (34) is responsible for identification of the model of pupil dynamics.

For the purpose of identification of eye aliveness parameters, the system employs typical optimization techniques. The system performs the minimization of the square error as follows:

$$\hat{\theta} = \operatorname*{argmin}_{\theta \in \Theta} \sum_{i=1}^{N} \left(\tilde{f}_{i;\theta} - f_i\right)^2$$

where $\hat{\theta}$ means the required parameters, Θ is a set that defines the admissible values of the parameter θ, $\tilde{f}$ is the function of changes in the pupil size obtained from mathematical model for a pre-defined input signal of illumination changes, $f$ is the function of changes in the hypothetical pupil average diameter, whereas N is the number of determined values of $f$, i.e. the number of images in the sequence.

The method of parameter estimation consists in minimization of the sum of squares of the difference between the elements of the measured sequence of hypothetical pupil average diameter and the corresponding average diameter for the theoretical sequence for the model featuring pre-defined parameters.

Having determined the eye aliveness parameters θ in module 34, the system classifies these parameters by means of the classifier 37 by way of comparing the parameters θ with the statistical template 38 that accounts for dispersion of these parameters and the classification methodology is provided by the classification methodology module 39.

The invention claimed is:

1. A method of automatically testing whether a human eye is alive, the method comprising the steps:
   stimulating the pupil of the eye with light radiation emitted by an illuminator at a pre-defined profile of changing light intensity over a time period;
   generating a sequence of images of the pupil with a camera during the time period;
   calculating characteristic dimensions of a hypothetical pupil from each image in the sequence;
   determining a function $f$ from the sequence of images, wherein $f$ defines changes in the characteristic dimensions of the hypothetical pupil during the time period;
   estimating values for parameters θ of a pre-defined mathematical eye aliveness model comprising the parameters θ on the basis of the function $f$ of the changes of the hypothetical pupil;
   comparing the values of the determined parameters θ for the function $f$ with a statistical template of values of the parameters θ for the selected mathematical eye aliveness model by a classification process; and
   determining whether the eye is alive based on the comparison.

2. The method of claim 1, wherein the step of calculating characteristic dimensions is performed by a means for digital image processing.

3. The method of claim 1, wherein the characteristic dimensions for each image comprise the average diameter of the pupil, defined as the average value of horizontal and vertical axes of an ellipse that approximates the pupil in the respective image.

4. The method of claim 3, wherein the function $f$ represents change of the average diameter of the hypothetical pupil within the time period as a reaction to the light stimulation.

5. The method of claim 1, wherein the pre-defined profile of light intensity is a positive stepwise change of light intensity.

6. The method of claim 1, wherein the step of determining the parameters θ comprises minimizing the sum of the squares of the difference between elements of the calculated sequence of hypothetical pupil average diameters and corresponding average diameter values of a theoretical sequence for a model based on pre-defined parameters.

7. The method of claim 1, wherein the parameters θ comprise differentiating channel gain, inertial channel gain, differentiating channel time constants, inertial channel time constant, differentiating channel delay, and inertial channel delay.

8. A device for automatic eye aliveness testing comprising the following modules:

an illuminator with light intensity and light color automatic modification systems;

a camera with automatic exposure adjustment connected with the illuminator for obtaining images of a pupil of an eye;

and a measurement and control system connected with the camera and the illuminator;

wherein the measurement and control system comprises:

a converter that converts an analog signal from the camera into a digital image;

a hypothetical pupil localization module, which receives the digital image from the converter and calculates a localized position of the hypothetical pupil within the digital image, a characteristic dimension determination module, which calculates a characteristic dimension of the pupil based on the digital image from the converter and the localized position from the hypothetical pupil localization module;

a testing controller that receives the localized position from the hypothetical pupil localization module and produces a test initiation signal and sends the test initiation signal to the converter;

an illumination profile controller connected with the illuminator and that receives the test initiation signal from the testing controller and provides in response thereto an illumination intensity profile control signal to the illuminator;

an eye aliveness parameters determination module, which selects a model of pupil dynamics based on the characteristic dimensions of the pupil received from the hypothetical pupil localization module and the illumination intensity profile control signal from the illumination profile controller and which calculates one or more eye aliveness parameters from the model; and a classifier that receives the eye aliveness parameters from the eye aliveness parameter determination module and parameters from a statistical template and a classification methodology from a classification methodology module and determines whether the eye is alive.

\* \* \* \* \*